(12) United States Patent
Reich et al.

(10) Patent No.: US 10,601,901 B2
(45) Date of Patent: *Mar. 24, 2020

(54) METHODS, SYSTEMS, AND MEDIA FOR STORED CONTENT DISTRIBUTION AND ACCESS

(71) Applicant: The Trustees of Columbia University in the City of New York, New York, NY (US)

(72) Inventors: Joshua Reich, New York, NY (US); Oren Laadan, New York, NY (US); Vishal Misra, New York, NY (US); Eliahu Brosh, New York, NY (US); Jason Nieh, New York, NY (US); Daniel Stuart Rubenstein, New York, NY (US); Alexander Sherman, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/933,774

(22) Filed: Mar. 23, 2018

(65) Prior Publication Data

US 2019/0007480 A1 Jan. 3, 2019

Related U.S. Application Data

(63) Continuation of application No. 15/435,629, filed on Feb. 17, 2017, now Pat. No. 9,930,105, which is a
(Continued)

(51) Int. Cl.
*H04L 29/08* (2006.01)
*H04N 21/433* (2011.01)
(Continued)

(52) U.S. Cl.
CPC ......... *H04L 67/10* (2013.01); *H04N 21/4334* (2013.01); *H04N 21/632* (2013.01); *H04N 21/8456* (2013.01)

(58) Field of Classification Search
CPC .. H04L 67/10; H04N 21/4334; H04N 21/632; H04N 21/8456
See application file for complete search history.

(56) References Cited

U.S. PATENT DOCUMENTS

| 8,429,242 B1* | 4/2013 | Todd .................... H04N 21/232 709/217 |
| 2004/0031058 A1 | 2/2004 | Reisman |

(Continued)

OTHER PUBLICATIONS

Adler et al., "Optimal Peer Selection for P2P Downloading and Streaming", In Proceedings of the 24th Annual Joint Conference of the IEEE Computer and Communications Societies (INFOCOM'05), Miama, FL, US, Mar. 13-17, 2005, pp. 1538-1549.
(Continued)

*Primary Examiner* — Wing F Chan
*Assistant Examiner* — Billy H Ng
(74) *Attorney, Agent, or Firm* — Byrne Poh LLP (57) ABSTRACT

Methods for distributing and providing access to stored content from remote storage comprising: receiving a first request to access a first portion of stored content from a requestor, wherein the first request is in a file system request format; creating a placeholder for the stored content so that the placeholder has at least one parameter identical to the stored content and the placeholder can hold the first portion of the stored content and at least a second portion of the stored content; requesting the first portion of the stored content from remote storage; receiving the first portion of the stored content from the remote storage; storing the first portion of the stored content in the placeholder; and before the second portion of the stored content has been stored in
(Continued)

the placeholder, providing the first portion of the stored content to the requestor using a file system response format.

24 Claims, 4 Drawing Sheets

Related U.S. Application Data continuation of application No. 13/883,558, filed as application No. PCT/US2011/059662 on Nov. 7, 2011, now Pat. No. 9,609,044.

(60) Provisional application No. 61/556,806, filed on Nov. 7, 2011, provisional application No. 61/410,826, filed on Nov. 5, 2010.

(51) Int. Cl.
*H04N 21/63* (2011.01)
*H04N 21/845* (2011.01)

(56) References Cited

U.S. PATENT DOCUMENTS

| | | | |
|---|---|---|---|
| 2004/0205093 A1* | 10/2004 | Li | G06F 17/30017 |
| 2005/0289648 A1 | 12/2005 | Grobman et al. | |
| 2009/0106802 A1 | 4/2009 | Zuckerman et al. | |
| 2009/0222560 A1 | 9/2009 | Gopisetty et al. | |
| 2009/0271502 A1* | 10/2009 | Xue | H04L 67/104 |
| | | | 709/219 |
| 2009/0328171 A1 | 12/2009 | Bayus et al. | |
| 2010/0114853 A1 | 5/2010 | Fisher et al. | |
| 2013/0031459 A1* | 1/2013 | Khorashadi | G06F 17/30905 |
| | | | 715/234 |

OTHER PUBLICATIONS

Adler et al., "Pricing Multicast in More Practical Network Models", In Proceedings of the Thirteenth Annual ACM-SIAM Symposium on Discrete Algorithms (SODA '02), San Francisco, CA, US, Jan. 6-8, 2002, pp. 981-990.
Aho et al., "FlowPuter: A Cluster Architecture Unifying Switch, Server, and Storage Processing", In Proceedings of the 1st International Workshop on Data Processing and Storage Distributed: Towards Grid Computing (DPSN '04), Athens, GR, May 14, 2004, pp. 211-217.
Annapureddy et al., "Exploring VoD in P2P Swarming Systems", In IEEE Conference on Computer Communications (INFOCOM '07), Anchorage, AK, US, May 2007, pp. 1-5.
Bahl et al., "Opportunistic Use of Client Repeaters to Improve Performance of WLANs", In Journal of the IEEE/ACM Transactions on Networking, vol. 17, No. 4, Aug. 2009, pp. 1160-1171.
Baratto et al., "MobiDesk: Mobile Virtual Desktop Computing", In Proceeding of the 10th Annual ACM International Conference on Mobile Computing and Networking (MobiCom '04), Philadelphia, PA, USA, Sep. 26-Oct. 1, 2004, pp. 1-15.
Baratta et al., "THINC A Virtual Display Architecture for Thin-Client Computing", In Proceedings of the Twentieth ACM Symposium Om Operating Systems Principles (SOSP '05), Brighton, GB, Oct. 2005, pp. 277-290.
Baryshnikov et al., "Flood Search Under the California Split Rule", In Operations Research Letters, vol. 32, No. 3, May 2004, pp. 1-8.
Baryshnikov el al., "Predictability of Web-Server Traffic Congestion", In Proceedings of the 10th International Workshop on Web Content Caching and Distribution (WCW '05), Sep. 2005, pp. 1-7.
Bayati et al., "Maximum Weight Matching Via Max-Product Belief Propagation", In Proceedings of the International Symposium on Information Theory, (ISIT '05) Adelaide, Australia, Sep. 4-9, 2005, pp. 1763-1767.
Best Open Source, "Bindfs: Mount a Directory to Another Location and Alter Permission Bits", last accessed Dec. 21, 2015, pp. 1, available at: http://www.findbestopensource.com/product/bindfs.
Caprita et al., "Group Ratio Round-Robin: O (1) Proportional Share Scheduling for Uniprocessor and Multiprocessor Systems", In Proceedings of the USENIX Annual Technical Conference (USENIX '06), Boston, MA, US, May 30-Jun. 3, 2006, pp. 337-352.
Caprita et al., "Group Round Robin: Improving the Fairness and Complexity of Packet Scheduling", In Proceedings of the 1st ACM/IEEE Symposium on Architecture for Networking and Communications Systems (ANCS '05), Princeton, NJ, US, Oct. 26-28, 2005, pp. 29-40.
Caprita et al., "Grouped Distributed Queues: Distributed Queue, Proportional Share Multiprocessor Scheduling", In Proceedings of the 25th Annual ACM Symposium on Principles of Distributed Computing (PODC '06). Denver, CO, US, Jul. 23-26, 2006, pp. 72-81.
Chait et al., "Providing Throughput Differentiation for TCP Flows Using Adaptive Two-Color Marking and Multi-Level AQM", In Proceedings of the IEEE Conference on Computer Communications (INFOCOM '02), New York, NY, US, Jun. 23-27, 2002; pp. 1-9.
Chandra et al., "The Collective: A Cache Based System Management Architecture", In Proceedings of the 2nd USENIX Syposium on Networked Systems Design and Implementation (NSDI '05), Boston, MA, US, May 2-4, 2005, pp. 259-272.
Chang et al., "A General Model and Analysis of Physical Layer Capture in 802.11 Networks", In Proceedings of the 25th IEEE International Conference on Computer Communications (INFOCOM '06), Barcelona, ES, Apr. 23-29, 2006, pp. 1-12.
Chen et al., "Rapid Provisioning of Cloud Infrastructure Leveraging Peer-to-Peer Networks", In IEEE Computer Society ICDCS Workshops, Montreal, Quebec, CA, Jun. 22-26, 2009, pp. 324-329.
Chow el al., "Bittorrent: An Extensible Heterogeneous Model", In Proceedings of the 28th IEEE International Conference on Computer Communications (INFOCOM '09), Rio de Janeiro, BR, Apr. 19-25, 2009, pp. 585-593.
Coffman et al., "Network Resilience: Exploring Cascading Failures within BGP", In Proceedings of the 40th Annual Allerton Conference on Communication, Control, and Computing (Allerton '01), Urbana, IL, US, Oct. 2-4, 2002, pp. 1-10.
Coffman et al., "The Columbia Hotspot Rescue Service: A Research Plan", In Internet2 Network Research Workshop, Chicago, IL, US, Apr. 18-19, 2001, pp. 1-13.
Cohen, B., "Incentives Build Robustness in Bittorrent", In Proceedings of the Workshop on Economics of Peer-to-Peer Systems (P2PECON '03), Berkeley, CA, US, Jun. 5-6, 2003, pp. 1-5.
Dall et al., "KVM for ARM", In Proceedings of the 12th Annual Linux Symposium (Linux '10), Ottawa, CA, Jul. 13-16, 2010, pp. 1-12.
El-Sayed et al., "A Survey of Proposals for an Alternative Group Communication Service", In Network, vol. 17, No. 1, Jan./Feb. 2003, pp. 46-51.
eMule, "eMule Home Page", last accessed Dec. 21, 2015, pp. 1, available at: http://www.emule-project.net.
Figueiredo et al., "On the Autocorrelation Structure of TCP Traffic", In Journal of Computer Networks, vol. 40, No. 3, Oct. 22, 2002, pp. 339-361.
Github, "Twitter's Murder Project", last updated Oct. 11, 2012, pp. 1-4, available at: https://github.com/lg/murder.
Gnutella, "Welcome to Gnutella", last accessed Nov. 6, 2001, pp. 1-2, available at: http://web.archive.org/web/20011106012108/http://gnutella.wego.com.
Grade, "VirtualBox", last accessed Jan. 6, 2016, pp. 1-2, available at: http://www.virtualbox.org.
Hollot et al., "A Control Theoretic Analysis of RED", In Proceedings of the 20th Annual Joint Conference of the IEEE Computer and Communications Societies (INFOCOM '01), vol. 3, Anchorage, AK, US, Apr. 22-26, 2001, pp. 1510-1519.
Hollot et al., "Analysis and Design of Controllers for ACM Routers Supporting TCP Flows", In IEEE Transactions on Automatic Control, vol. 47, No. 6, Jun. 2002, pp. 945-959.
Hollot et al., "On Designing Improved Controllers for AQM Routers Supporting TCP Flows", In Proceedings of the 20th Annual Joint (56) References Cited

OTHER PUBLICATIONS

Conference of the IEEE Computer and Communications Societies (INFOCOM '01), vol. 3, Anchorage, AK, US, Apr. 22-26, 2001, pp. 1726-1734.
Hoskins, M., "SSHFS: Super Easy File Access over SSH", In Linux Journal, Apr. 28, 2006, pp. 1-5, available at: http://www.linuxjournal.com/article/8904.
Hosseini et al., "A Survey of Application-Layer Mulitcast Protocols", In IEEE Communications Surverys and Tutorials, vol. 9, No. 3, Sep. 27, 2007, pp. 58-74.
Huang et al., "Challenges, Design, and Analysis of a Large-Scale P2P-VoD System", In Proceedings of the Special Interest Group on Data Communication (SIGCOMM '08), Seattle, WA, US, Aug. 17-22, 2008, pp. 375-388.
Huang et al., "Exact Graph Structure Estimation with Degree Priors", In Proceedings of the 8th International Conference on Machine Learning and Application (ICMLA '09), Miami Beach, FL, US, Dec. 13-15, 2009, pp. 111-118.
Huang et al., "Loopy Belief Propagation for Bipartite Maximum Weight B-Matching", In Proceedings of the 11th International Conference on Artificial Intelligence and Statistics (AISTATS '07), San Juan, PR, Mar. 21-24, 2007, pp. 195-202.
Huang et al., "Maximum Likelihood Graph Structure Estimation with Degree Distributions", In Analyzing Graphs: Theory and Applications (NIPS '08), Dec. 12-13, 2008, pp. 1-6.
Hwang et al., "Stored Media Streaming in Bittorrent-like P2P Networks" In Columbia University Computer Science Technical Report, vol. CUCS-024-08, Apr. 2008, pp. 1-12.
IANA, "IANA Guidelines for IPv4 Multicast Address Assignments RFC 3171", Aug. 2001, pp. 1-8, available at: https://www.rfc-editor.org/rfc/rfc3171.txt.
IANA. "IP Version 5 Addressing Architecture. RFC 4291", Feb. 2006, pp. 1-23, available at: http://www.rfc-base.org/txt/rfc-4291.txt.
International Patent Application No. PCT/US2011/059662, filed Nov. 7, 2011.
International Preliminary Report on Patentability dated May 16, 2013 in International Patent Application No. PCT/US2011/059662.
International Search Report and Written Opinion dated Mar. 15, 2012 in International Patent Application No. PCT/US2011/059662.
Jebara, T., "Multitask Sparsity via Maximum Entropy Discrimination", In Journal of Machine Learning Research, vol. 12, Jan. 2011, pp. 75-110.
Jumpbox, "Jumpbox Library", last accessed Dec. 24, 2015, pp. 1-2, available at: http://ww.jumpbox.corm/library.
Karma et al., "The Effect of DNS Delays on Worm Propagation in an IPv6 Internet", In Proceedings of the 24th Annual Joint Conference of the IEEE Computer and Communications Societies (INFOCOMM '05), vol. 4, Miami, FL, US, Mar. 13-17, 2005, pp. 2405-2414.
KaZaA, "KaZaA", Feb. 10, 2010, pp. 1-3, available at: https://web.archive.org/web/20100215014032/http://www.kazaa.com.
Keromytis et al., "A Holistic Approach to Service Survivability", In Proceedings of the 2003 ACM Workshop on Survivable and Self-Regenerative Systems (SSRS '03), Washington DC, US, Oct. 27-30, 2003, pp. 11-22.
Keromytis et al., "SOS: An Architecture for Mitigating DDoS Attack", In IEEE Journal on Selected Areas of Communications (JSAC), vol. 22, No. 1, Jan. 2004, pp. 176-188.
Keromytis et al., "SOS: Secure Overlay Services", In Proceedings of the 2002 Conference on Applications, Technologies, Architectures, and Protocols for Computer Communications (SIGCOMM '02), vol. 32, No. 4, Pittsburgh, PA, US, Aug. 19-23, 2002, pp. 61-72.
Kim et al., "An Application Streaming Service for Mobile Handheld Devices", In Proceedings of the IEEE International Conference on Services Computing (SCC '06), Chicago, IL, US, Sep. 18-22, 2006, pp. 323-326.
Kim et al., "pTHINC: A Thin-Client Architecture for Mobile Wireless Web", In Proceedings of the 15th International World Wide Web Conference (WWW '06), Edinburgh, Scotland, May 23-26, 2006, pp. 143-152.
Kivity, A., "KVM: The Linux Virtual Machine Monitor", In Proceedings of the Linux Symposium, vol. 1, Ottawa, ON, CA, Jun. 27-30, 2007, pp. 225-230.
Ko et al., "A Distributed, Self-Stabilizing Protocol for Placement of Replicated Resources in Emerging Networks", In Proceedings of the 11th IEEE international Conference on Network Protocols (ICNP '03), Atlanta, GA, US, Nov. 4-7, 2003, pp. 6-15.
Ko, B.J., "Distributed Channel Assignment in Multi-Radio 802.11 Mesh Networks", In Proceedings of the IEEE Wireless Communications and Networking Conference (WCNC '07), Hong Kong, CN, Mar. 11-15, 2007, pp. 3978-3983.
Kondor et al., "Gaussian and Wishart Hyperkernels", In Proceedings of the Neural Information Processing Systems (NIPS '06), Vancouver, CA, Dec. 4-9, 2006, pp. 729-736.
Kondor et al., "Multi-Object Tracking with Representations of the Symmetric Group", In Proceedings of the Eleventh International Conference on Artificial intelligence and Statistics (AISTATS'07), San Juan, PR, Mar. 21-24, 2007, pp. 211-218.
Kozuch et al., "Internet Suspend and Resume", In Proceedings of the Fourth IEEE Workshop on Mobile Computing Systems and Applications, Calicoon, NY, US, Jun. 21, 2002, pp. 40-46.
Kumar et al., "Fluid Modeling of Pollution Proliferation in P2P Networks", In Proceedings of the Jount International Conference on Measurement and Modeling of Courripter Systems (SIGMETRICS '06), Jun. 2006, pp. 1-12.
Leaden et al., "DejaView: A Personal Virtual Computer Recorder", In Proceedings of the Twenty-First ACM Symposium on Operating Systems Principles (SOSP '07), Stevenson, WA, US, Oct. 14-17, 2007, pp. 279-292.
Leaden et al., "Linux-CR: Transparent Application Checkpoint-Restart in Linux", In Proceedings of the 12th Annual Linux Symposium, Ottawa, CA, Jul. 13-16, 2010, pp. 159-173.
Laadan et al., "Operating System Virtualization: Practice and Experience", In Proceedings of the 3rd Annual Haifa Experimental Systems Conference (SYSTOR '10), Haifa, IL, May 24-26, 2010, pp. 1-12.
Leaden et al., "Teaching Operating Systems Using Virtual Appliances and Distributed Version Control", In Proceedings of the 41st ACM Technical Symposium on Computer Science Education (SIGCSE '10), Milwaukee, WI, US, Mar. 10-13, 2010, pp. 480-484.
Leaden et al., "Transparent Checkpoint-Restart of Distributed Applications on Commodity Clusters", In Proceedings of the 2005 IEEE International Conference on Cluster Computing (Cluster '05), Boston, MA, US, Sep. 27-30, 2005, pp. 1-13.
Laadan et al., "Transparent Checkpoint-Restart of Multiple Processes on Commodity Operating Systems", In Proceedings of the 2007 USENIX Annual Technical Conference, (ATC '07), Santa Clara, CA, US, Jun. 17-22, 2007, pp. 323-336.
Lagar-Cavilla et al., "SnowFlock: Rapid Virtual Machine Cloning for Cloud Computing", In Proceedings of the 4th ACM European Conference on Computer Systems (EuroSys '09), Nuremberg, DE, Apr. 1-3, 2009, pp. 1-12.
Lai et al., "Improving Web Browsing on Wireless PDAs Using Thin-Client Computing", In Proceedings of the 13th International Conference on World Wide Web (WWW'04), New York, NY, US, May 17-20, 2004, pp. 143-154.
Lai et al., "Limits of Wide-Area Thin-Client Computing", In Proceedings of the ACM International Conference on Measurement and Modeling of Computer Systems (SIGMETRICS 2002), Marina del Rey, CA, US, Jun. 15-19, 2002, pp. 228-239.
Lai et al., "On the Performance of Wide-Area Thin-Client Computing", In Proceedings of the ACM Transactions on Computer Systems (TOCS '06), vol. 24, No. 2, May 2006, pp. 175-209.
Lai et al., "Remote Display Performance for Wireless Healthcare Computing", In Proceedings of the 11th World Conference on Medical Informatics (MEDINFO '04), San Francisco, CA, US, Sep. 7-11, 2004, pp. 1438-1442.

(56) References Cited

OTHER PUBLICATIONS

Lai et al., "REPETE2: A Next Generation Home Telemedicine Architecture", In Proceedings of the Amercan Medical Informatics Association 2007 Annual Symposium (AMA '07), Chicago, IL, US, Nov. 10-14, 2007, pp. 1020.

Lai et al., "The Remote Patient Education in a Telemedicine Environment Architecture (REPETE)", In Telemedicine and e-Health, vol. 14, No. 4, May 20, 2008, pp. 355-361.

Lai et al., "Thin Client Performance for Remote 3-D Image Display", In Proceedings of the American Medical Informatics Association Annual Symposium (AMIA '03), Washington, DC, US, Nov. 2003, pp. 1.

Lee et al., "Distributed Algorithms for Secure Multipath Routing", In Proceedings of IEEE/ACM Transactions on Networking (TON), (INFOCOM'07), Dec. 2007, vol. 15, No. 6, pp. 1490-1501.

Li et al., "Low-Complexity Interpolation Coding for Server-Based Computing", In Proceeding of the Data Compression Conference (DCC '02), Snowbird, UT, US, Apr. 2-4, 2002, pp. 461.

Li et al., "Optimal Linear Interpolation Coding for Server-Based Computing", In Proceedings of the IEEE International Conference on Communications (ICC '02), vol. 4, New York, NY, US, Apr. 28-May 2, 2002, pp. 2542-2546.

Libtorrent, "libtorrent: C++ Bittorent Library", last accessed Jan. 5, 2016, pp. 1-2, available at: https://code.google.com/p/libtorrent/downloads/list.

Liu et al., "A Survey on Peer-to-Peer Video Streaming Systems", In Peer-to-Peer Networking and Applications, Mar. 2008, pp. 18-28.

Lui et al., "On the Robustness of Soft State Protocols", In Proceedings of the 12th IEEE International Conference on Network Protocols (ICNP'04), Berlin, DE, Oct. 5-8, 2004, pp. 1092-1648.

Ma et al., "An Analysis of Generalized Slotted-Aloha Protocols", In IEEE/ACM Transactions on Distributed, vol. 17, No. 3, Jun. 2009, pp. 936-949.

Ma et al., "Internet Economics: The Use of Shapley Value for ISP Settlement", In Proceedings of the ACM Conference on Emerging Networking Experiments and Technologies (CoNext '07), Dec. 2007, pp. 1-12.

Ma et al., "Modeling and Analysis of Generalized Slotted-Aloha MAC Protocols in Cooperative, Competetive and Adversarial Environments", In Proceedings of the International Conference on Distributed Computer Systems (ICDCS '06), Lisboa, PT, Jul. 4-7, 2006, pp. 1-8.

Marciniak et al., "Small is not Always Beautiful", In Proceedings of the 7th International Conference on Peer to Peer Systems (IPTPS '08), Tampa Bay, FL, US, Feb. 25-26, 2008, pp. 1-6.

Mietzner et al., "Towards Provisioning the Cloud: on the Usage of Multi-Granularity Flows and Services to Realize a Unified Provisioning Infrastructure for SAAS Applications", In IEEE Services, Washington, DC, US, Jul. 6-11, 2008, pp. 3-10.

Misra et al., "Fluid-based Analysis of a Network of AQM Routers Supporting TCP Flows with an Application to RED", In Proceedings of the ACM Special Interest Group on Data Communication (SIGCOMM '00), Stockholm, SE, Aug. 28-Sep. 1, 2000, pp. 1-10.

Misra et al., "Stochastic Differential Equation Modeling and Analysis of TCP Windowsize Behavior", Technical Report ECE-TR-CCS-99-10-01, Oct. 1, 1999, pp. 1-8.

MokaFive, "Product Components", Apr. 19, 2010, pp. 1-2, available at: https://web.archive.org/web/20100419120737/http://www.mokafive.com/products/components.php.

Nieh et al., "A SMART Scheduler for Multimedia Applications", In ACM Transactions on Computer Systems (TOCS '03), vol. 21, No. 2, May 2003, pp. 117-163.

Nieh et al., "Examining VMare", In Dr. Dobb's journal, vol. 25, No. 8, Aug. 2000, pp. 70-76.

Nieh et al., "Experiences Teaching Operating Systems Using Virtual Platforms and Linux", In Proceedings of the Thirty-Sixth ACM Technical Symposium on Computer Science Education (SIGCSE '05), St. Louis. MO, US, Feb. 23-27, 2005, pp. 520-524.

Nieh et al., "Measuring the Multimedia Performance of Server-Based Computing", In Proceedings of the Tenth International Workshop on Network and Operating System Supporting Digital Audio and Video (NOSSDAV '00), Chapel Hill, NC, US, Jun. 26-28, 2000, pp. 55-64.

Nieh et al., "Measuring Thin-Client Performance using Slow-Motion Benchmarking", In ACM Transactions on Computer Systems (TOCS '03), vol. 21, No. 1, Feb. 2003, pp. 87-115.

Nieh et al., "Virtual-Time Round-Robin: An 0(1) Proportional Share Scheduler", In Proceedings of the 2001 USENIX Annual Technical Conference, (USENIX '01), Boston, MA, US, Jun. 25-30, 2001, pp. 245-259.

Notice of Allowance dated Jan. 17, 2017 in U.S. Appl. No. 13/883,558.
Notice of Allowance dated Aug. 7, 2017 in U.S. Appl. No. 15/435,629.
Notice of Allowance dated Dec. 13, 2017 in U.S. Appl. No. 15/435,629.

Ocheltree et. al., "Net2Display: A Proposed VESA Standard for Remoting Displays and I/O over Networks" In Proceedings of the 2006 Americas Display Engineering and Applications Conference (ADEAC '06), Atlanta, GA, US, Oct. 23-26, 2006, pp. 1-4.

O'Donnell, C.M., "Using BitTorrent to Distribute Virtual Machine Images for Classes", In Proceedings of the 36th Annual ACM SIGUCCS Conference on User Services (SIGUCCS '08), Portland, OR, US, Oct. 19-22, 2008, pp. 287-290.

Office Action dated Feb. 25, 2016 in U.S. Appl. No. 13/883,558.
Office Action dated Aug. 25, 2015 in U.S. Appl. No. 13/883,558.

Olshefski et al., "Inferring Client Response Time at the Web Server", In Proceedings of the ACM International Conference on Measurement and Modeling of Computer Systems (SIGMETRICS '02), Marina del Rey, CA, US, Jun. 15-19, 2002, pp. 160-171.

Olshefski et al., "ksniffer: Determining the Remote Client Perceived Response Time from Live Packet Streams", In Proceedings of the 6th Symposium on Operating Systems Design and Implementation (OSDI '04), San Francisco, CA, US, Dec. 6-8, 2004, pp. 333-346.

Olshefski et al., "Understanding the Management of Client Perceived Response Time", In Proceedings of the Joint International Conference on Measurement and Modeling of Computer Systems (SIGMETRICS '06), St. Malo, FR, Jun. 26-30, 2006, pp. 240-251.

Olshefski et al., "Using Certes to Infer Client Response Times at the Web Server", In ACM Transactions on Computer Systems (TOCS '04), vol. 22, No. 1, Feb. 2004, pp. 49-93.

Olshefski, D.P., "Measuring and Managing the Remote Client Perceived Response Time for Web Transactions using Server-Side Techniques", Ph.D Thesis, Columbia University, Oct. 2006, pp. 1-243.

Osman et al., "The Design and Implementation of ZAP: A System for Migrating Computing Environments", In Proceedings of the 5th Symposium on Operating Systems Design and Implementation (OSDI '02), Boston, MA, US, Dec. 9-11, 2002, pp. 361-376.

Parvez et al., "Analysis of Bittorrent-like Protocols for On-Demand Stored Media Streaming" In Proceedings of the 2008 ACM SIGMETRICS International Conference on Measurement and Modeling of Computer Systems (SIGMETRICS '08) Annapolis, MD, US, Jun. 2-6, 2008, vol. 36, pp. 301-312.

Potter et al., "Apiary: Easy-to-Use Desktop Application Fault Containment on Commodity Operating Systems", In Proceedings of the 2010 USENIX Annual Technical Conference, Boston, MA, US, Jun. 2010, pp. 103-116.

Potter et al., "AutoPod: Unscheduled System Updates with Zero Data Loss", In Proceedings of the Second IEEE International Conference on Autonomic Computing (ICAC '05), Seattle, WA, US, Jun. 2005, pp. 367-368.

Potter et al., "Breaking the Ties that Bind: Process Isolation and Migration", In login, vol. 30, No. 6, Dec. 2005, pp. 14-17.

Potter et al., "GamePod: Persistent Gaming Sessions on Pocketable Storage Devices", In Proceedings of the 3rd International Conference on Mobile Ubiquitous Computing, Systems, Sciences, and Technologies (UBICOMM '09), Sliema, MT, Oct. 2009, pp. 269-276.

Potter et al., "Highly Reliable Mobile Desktop Computing in Your Pocket", In Proceedings of the IEEE Computer Society Signature Conference Oil Software Technology and Applications (COMPSAC '06), Chicago, IL, US, Sep. 2006, pp. 247-254.

(56) References Cited

OTHER PUBLICATIONS

Potter et al., "MediaPod: A Personalized Multimedia Desktop in Your Pocket", In Proceedings of the IEEE International Symposium on Multimedia (ISM '09), San Diego, CA, US, Dec. 2009, pp. 219-226.

Potter et al., "Reducing Downtime Due to System Maintenance and Upgrades", In Proceedings of the Ninereemh Large Instonarion System Administration Conference (LISA '05), San Diego, CA, US, Dec. 2005, pp. 47-62.

Potter et al., "Secure Isolation and Migration of Untrusted Legacy Applications", Technical Report, CUCS-005-04, Columbia University, Jan. 2004, pp. 1-16.

Potter et al., "Secure Isolation of Untrusted Legacy Applications", In Proceedings of the Twenty-First Large Installation System Administration Conference (LISA '07), Donas, TX, US, Nov. 2007, pp. 117-130.

Potter et al., "Two Person Controller Administration: Preventing Administrative Faults Through Duplication", In Proceedings of the 23rd Large Installation System Administration Conference (LISA '09), Baltimore, MD, US, Nov. 2009, pp. 15-27.

Potter et al., "Web Pod: Persistent Web Browsing Sessions with Pocketable Storage Devices", In Proceedings of the Fourteenth International World Wide Web Conference (WWW '05), Chiba, JP, May 2005, pp. 603-612.

Potter, S., "Virtualizarion Mechanisms for Mobility, Security and System Administration", PhD Thesis, Columbia University, May 2010, pp. 1-241.

Qiu et al., "Modeling and Performance Analysis of BitTorrent-like Peer-to-Peer Networks", In Proceedings of the ACM Conference on Applications, Technologies, Architectures, and Protocols for Computer Communication (SIGCOMM '04), Portland, OR, US, Aug. 30-Sep. 3. 2004, pp. 367-378.

Rajendran et al., "Optimizing the Quality of Scalable Video Streams on P2P Networks", In Proceedings of IEEE Global Telecommunications Conference (GLOBECOM '04), Dallas, TX, US, Nov. 29-Dec. 3, 2004, pp. 1-7.

Rajendran et al., "Theoretical Bounds on Control-Plane Selfmonitoring in Routing Protocol", In Proceedings of the ACM Joint International Conference on Measurement and Modeling of Computer Systems (SIGMETRICS '07), Jun. 2007, pp. 1-12.

Reich et. al., "VMtorrent: Virtual Appliances on Demand" In Proceedings of the Special Interest Group on Data ACM SIGCOMM (SIGCOMM '10), New Delhi, IN, Aug. 30-Sep. 3, 2010, pp. 453-454.

Rubenstein, et al., "Can Unstructured P2P Protocols Survive Flash Crowds", In IEEE/ACM Transactions on Networking, vol. 13, No. 3, Jun. 2005, pp. 501-512.

Salez et al., "Optimality of Belief Propagation for Random Assignment Problem", In Proceedings of the Twentieth Annual ACM-SIAM Symposium on Discrete Algorithms (SODA '09), New York, NY, US, Jan. 4-6, 2009, pp. 187-196.

Schmidt et al., "Efficient Distribution of Virtual Machines for Cloud Computing", In Euromicro Conference on Parallel, Distributed, and Network-Based Processing, Pisa, IT, Feb. 17-19, 2010, pp. 567-574.

Sherman et al., "Adding Trust to P2P Distribution of Paid Content", In Proceeedings of the 12th Information Security Conference (ISC '09), Pisa, IT, Sep. 7-9, 2009, pp. 459-474.

Sherman, A., "FairTorrent: Bringing Fairness to Peer-to-Peer Systems", In Proceedings of the 5th ACM Conference on Emerging Distributed Experiments and Technologies (CoNEXT '09), Rome, IT, Dec. 1-4, 2009, pp. 133-144.

Sherman, A., "Guaranteeing Performance Through Fairness in Peer-to-Peer File-Sharing and Streaming Systems", PhD Thesis, Columbia University, Oct. 2010, pp. 1-207.

Shi et al., "Iceberg: An Image Streamer for Space and Time Efficient Provisioning of Virtual Machines", In IEEE Computer Society ICPP-Workshops, Wasington DC, US, Sep. 2008, pp. 31-38.

Sidiroglou et al., "ASSURE: Automatic Software Self-Healing using Rescue Points", In Proceedings of the 14th International Conference on Architectural Support for Programming Languages and Operating Systems (ASPLOS XIV '09), Washington DC, US, Mar. 7-11, 2009, pp. 37-48.

Sidiroglou et al., "Using Rescue Points to Navigate Software Recovery (Short Paper)", In Proceedings of the IEEE Symposium on Security and Privacy, Oakland, CA, US, May 2007, pp. 273-280.

Stavrou et al., "A Lightweight, Robust P2P System to Handle Flash Crowds", In Proceedings of the 10th IEEE international Conference on Network Protocols (ICNP '02), Paris, FR, Nov. 12-15, 2002, pp. 226-235.

Stavrou et al., "A2M: Access-Assured Mobile Desktop Computing", In Proceedings of the 12th International Conference on Information Security Conference (ISD '09), Pisa, IT, Sep. 7-9, 2009, pp. 186-201.

Stavrou et al., "MOVE: An End-to-End Solution to Network Denial of Service", In Proceedings of the 12th Annual Network and Distributed System Security Symposium (NOSS '05), San Diego, CA, US, Feb. 2-4, 2005, pp. 81-96.

Sun, G., "MOVE: Mobility with Persistent Network Connections", Dissertation, Columbia University, Oct. 2004, pp. 1-261.

Szeredi, M., "FUSE: File System in Userspace", last accessed May 1, 2016, pp. 1-3, available at: https://github.com/libfuse/libfuse.

Turnkey Linux, "Turnkey Linux", last accessed Jan. 6, 2016, pp. 1-2, available at: http://www.turnkeylinux.org.

U.S. Appl. No. 61/410,826, filed Nov. 5, 2010.

U.S. Appl. No. 61/556,806, filed Nov. 7, 2011.

Villena et al., "Performance Analysis of Server Sharing Collectives for Content Distribution", In Proceedings of the 11th International Workshop on Quality of Service (IWQoS '03), Berkeley, CA, US, Jun. 2-4, 2003, pp. 41-58.

Vlavianos et al., "BiToS: Enhancing BitTorrent for Supporting Streaming Applications", In Proceedings of 25th IEEE International Conference on Computer Communications (INFOCOM '06), Barcelona, ES, Apr. 23-29, 2006, pp. 1-6.

VMWare, "VMware Player", last accsesed Jan. 6, 2016, pp. 1-11, available at: http://www.vmware.com/products/player/.

VMWare, "VMWare Virtual Appliance Marketplace", Jan. 10, 2012, pp. 1-2, available at: https://web.archive.org/web/20120110212009/http://www.vmware.com/appliances/directory.

Wang et al., "R2: Random Push with Random Network Coding in Live Peer-to-Peer Streaming", In IEEE Journal on Selected Areas in Communications, vol. 25, No. 9, Dec. 2007, pp. 1655-1666.

Wartel et al., "Image Distribution Mechanisms in Large Scale Cloud Providers", In IEEE CloudCom, Indianapolis, IN, US, Nov. 30-Dec. 3, 2010, pp. 112-117.

White et al., "An Integrated Experimental Environment for Distributed Systems and Networks", Boston, MA, US, Dec. 2002, pp. 255-270.

Wu et al., "Queuing Network Models for Multi-Channel P2P Live Streaming Systems", In IEEE Conference on Computer Communications (INFOCOM '09) Rio de Janeiro, BR, Apr. 19-25, 2009, pp. 73-81.

Yang et al., "MetaFrame XP Extends the Citrix Platform", In PC Magazine, vol. 21, No. 9, May 2002, pp. 48.

Yang et al., "The Performance of Remote Display Mechanisms for Thin-Client Computing", In Proceedings of the 2002 USENIX Annual Technical Conference, Monterey, CA, US, Jun. 2002, pp. 131-146.

Yang et al., "Thin Is In", In PC Magazine, vol. 19, No. 13, Jul. 2000, pp. 68.

Yang et al., "Web Browsing Performance of Wireless Thin-Client Computing", In Proceedings of the Twelth International World Wide Web Conference (WWW '03), Budapest, HU, May 2003, pp. 1-12.

Yang, S.J., "Measuring Thin-Client Performance Using SlowMotion Benchmarking", In Proceedings of the 2001 USENIX Annual Technical Conference, Boston, MA, US, Jun. 2001, pp. 35-49.

Zadok et al., "Fast Indexing: Support for Size-Changing Algorithms in Stackable File Systems", In Proceedings of the General Track: 2001 USENIX Annual Technical Conference (USENIX '01), Boston, MA, US, Jun. 25-30, 2001, pp. 289-304.

Zadok et al., "FiST: A Language for Stackable File Systems", In Proceedings of the Annual USENIX Technical Conference, San Diego, CA, USA, Jun. 18-23, 2000, pp. 55-70.

(56) References Cited

OTHER PUBLICATIONS

Zadok et al., "FiST: A System for Stackable File-System Code Generation", Ph.D Thesis, Columbia University, May 2001, pp. 1-141.
Zadok et al., "Reducing Storage Management Costs via Informed User-Based Policies", In Proceedings of the 21st IEEE Conference on Mass Storage Systems and Technologies (MSST '04), Greenbelt, MD, US, Apr. 13-16, 2004, pp. 193-197.
Zhang et al., "CoolStreaming/DONet: A Data-Driven Overlay Network for Peer-to-Peer Live Media Streaming", In IEEE Conference on Computer Communications (INFOCOM '05), Mar. 2005, pp. 2102-2111.
Zhang et al., "Portable Desktop Applications Based on P2P Transportation and Virtualization", In Proceedings of the 22nd Large Installation System Administration Conference (LISA '08), San Diego, CA, US, Nov. 9-14, 2008, pp. 133-144.
Zheng et al., "RSIO: Automatic User Interaction Detection and Scheduling", In Proceedings of the 2010 ACM SIGMETRICS International Conference on Measurement and Modeling of Computer Systems (SIGMETRICS '10), New York, NY, US, Jun. 14-18, 2010, pp. 263-274.
Zheng et al., "SWAP: A Scheduler With Automatic Process Dependency Detection", In Proceedings of the 1st Symposium on Networked Systems Design and Implementation (NSDI '04), San Francisco, CA, US, Mar. 29-31, 2004, pp. 183-196.
Zheng et al., "WARP: Enabling Fast CPU Scheduler Development and Evaluation" In Proceedings of the 2009 IEEE International Symposium on Performance Analysis of Systems and Software (ISPASS '09), Boston, MA, US, Apr. 26-28, 2009, pp. 101-112.
Zhou et al., "A Simple Model for Analyzing P2P Streaming Protocols", In IEEE International Conference on Network Protocols (INCP '07), Beijing, CN, Oct. 16-19, 2007, pp. 226-235.

\* cited by examiner

METHODS, SYSTEMS, AND MEDIA FOR STORED CONTENT DISTRIBUTION AND ACCESS

CROSS-REFERENCE TO RELATED APPLICATION

This application is a continuation of U.S. patent Ser. No. 15/435,629, filed Feb. 17, 2017, which is a continuation of U.S. patent Ser. No. 13/883,558, filed Dec. 19, 2013, which is the U.S. National Phase Application Under 35 U.S.C. § 371 of International Application No. PCT/US2011/059662, filed Nov. 7, 2011, which claims the benefit of United States Provisional Patent Application Nos. 61/410,826, filed Nov. 5, 2010, and 61/556,806, filed Nov. 7, 2011, each of which is hereby incorporated by reference herein in its entirety.

STATEMENT REGARDING GOVERNMENT SPONSORED RESEARCH

This invention was made with government support under Grant Nos. 0964497 and 1017934 awarded by the National Science Foundation. The government has certain rights in the invention.

TECHNICAL FIELD

Methods, systems, and media for stored content distribution and access are provided.

BACKGROUND

With the continuing increase in the number of computer systems which store content on network-connected storage systems, there is a continuing increase in the number of very large pieces of stored content (which as described further below, can include programs, data, etc.) that need to be communicated from a remote storage system to a local storage system before those pieces of stored content can be accessed. For example, when an image for a portion of a disk drive is stored on a remote server, and a user wants to execute an application in that image, the image may need to be transferred to a storage device local to the user so that sufficient latency performance is available to ensure a satisfying user experience.

However, transferring very large pieces of stored content, can take a significant amount of time depending on network performance. This delay in transferring very large pieces of stored content can prevent a user from being able to rapidly load and execute a desired application.

Accordingly, new methods, systems, and media for stored content distribution and access are desirable.

SUMMARY

Methods, systems, and media for stored content distribution and access are provided. In accordance with some embodiments, methods for distributing and providing access to stored content from remote storage are provided, the methods comprising: receiving a first request to access a first portion of stored content from a requestor, wherein the first request is in a file system request format; creating a placeholder for the stored content so that the placeholder has at least one parameter identical to the stored content and the placeholder can hold the first portion of the stored content and at least a second portion of the stored content; requesting the first portion of the stored content from remote storage; receiving the first portion of the stored content from the remote storage; storing the first portion of the stored content in the placeholder; and before the second portion of the stored content has been stored in the placeholder, providing the first portion of the stored content to the requestor using a file system response format.

In accordance with some embodiments, these methods further comprise: determining a profile associated with the stored content, wherein indicators in the profile indicate an order in which a plurality of portions of the stored content are likely to be accessed; based on the indicators in the profile, selecting a second portion of the stored content to be retrieved before it is requested by the requestor; requesting the second portion of the stored content from the remote storage; receiving the second portion of the stored content from the remote storage; receiving a second request for the second portion of the stored content from the requestor after receiving the second portion of the stored content from the remote storage, wherein the second request is in the file system request format; and providing the second portion of the stored content to the requestor using the file system response format.

In accordance with some embodiments, systems for distributing and providing access to stored content from remote storage are provided, the systems comprising: at least one hardware processor that: receives a first request to access a first portion of stored content from a requestor, wherein the first request is in a file system request format; creates a placeholder for the stored content so that the placeholder has at least one parameter identical to the stored content and the placeholder can hold the first portion of the stored content and at least a second portion of the stored content; requests the first portion of the stored content from remote storage; receives the first portion of the stored content from the remote storage; stores the first portion of the stored content in the placeholder; and before the second portion of the stored content has been stored in the placeholder, provides the first portion of the stored content to the requestor using a file system response format.

In accordance with some embodiments, in these systems, the at least one hardware processor also: determines a profile associated with the stored content, wherein indicators in the profile indicate an order in which a plurality of portions of the stored content are likely to be accessed; based on the indicators in the profile, selects a second portion of the stored content to be retrieved before it is requested by the requestor; requests the second portion of the stored content from the remote storage; receives the second portion of the stored content from the remote storage; receives a second request for the second portion of the stored content from the requestor after receiving the second portion of the stored content from the remote storage, wherein the second request is in the file system request format; and provides the second portion of the stored content to the requestor using the file system response format.

In accordance with some embodiments, non-transitory computer-readable media containing computer-executable instructions that, when executed by a processor, cause the processor to perform a method for distributing and providing access to stored content from remote storage are provided, the method comprising: receiving a first request to access a first portion of stored content from a requestor, wherein the first request is in a file system request format; creating a placeholder for the stored content so that the placeholder has at least one parameter identical to the stored content and the placeholder can hold the first portion of the stored content and at least a second portion of the stored content; requesting the first portion of the stored content from remote storage; receiving the first portion of the stored content from the remote storage; storing the first portion of the stored content in the placeholder; and before the second portion of the stored content has been stored in the placeholder, providing the first portion of the stored content to the requestor using a file system response format.

In accordance with some embodiments, in these media, the method further comprises: determining a profile associated with the stored content, wherein indicators in the profile indicate an order in which a plurality of portions of the stored content are likely to be accessed; based on the indicators in the profile, selecting a second portion of the stored content to be retrieved before it is requested by the requestor; requesting the second portion of the stored content from the remote storage; receiving the second portion of the stored content from the remote storage; receiving a second request for the second portion of the stored content from the requestor after receiving the second portion of the stored content from the remote storage, wherein the second request is in the file system request format; and providing the second portion of the stored content to the requestor using the file system response format.

BRIEF DESCRIPTION

DETAILED DESCRIPTION

Methods, systems, and media for stored content distribution and access are provided.

In accordance with some embodiments, mechanisms for stored content distribution and access are provided. These mechanisms can enable a device and/or a process to receive and use stored content by delivering the portions of the stored content to the device and/or the process as needed or prior to the portions of the stored content being needed. In some embodiments stored content can include anything that can be stored in a storage device. For example, stored content can include data, media, programs, applications, code, instructions, scripts, configuration information, storage device images, and/or any other suitable content stored in a storage device. A device that can receive and use such stored content can be a general or special purpose computer, a media player, a mobile phone, a network appliance, and/or any other suitable device. A process that can receive and use such stored content can be an application, a program, a server, a client, a database, a storage system, a media player, a data display, a communication mechanism, a virtual machine, a virtual machine monitor, a hypervisor, etc. Stored content can be stored in any suitable storage device such as a disk drive, memory, a virtual disk drive, an optical drive (e.g., a CD drive, a DVD drive, etc.), etc., for example.

In accordance with some embodiments, mechanisms for stored content distribution and access can be implemented as one or more torrent peers as described herein. A torrent peer can be any suitable application, device, etc. that can share store content with other peers across a network using a BitTorrent style of exchanging stored content. However, such mechanisms are not limited to being implemented as torrent peers and can be provided using other general architectures.

For example, in some embodiments, such mechanisms can provide file system services for an application, device, etc. These file system services can include, for example, retrieving programs and/or data associated with the application, device, etc., and storing a locally modifiable copy of the programs and/or data. Additionally, in this example and in some embodiments, these mechanisms can store one or more read-only copies of the programs and/or data so that portions of the programs and/or data can be served or transmitted to other peer computing devices or other peer instances that also need the programs and/or data.

In a more particular example of such embodiments, these mechanisms can initially provide a file system that is empty. In response to a request for a portion of stored content from an application, device, etc., the mechanisms can create a suitable placeholder in the file system for the stored content. The placeholder can include any suitable file system content at the time that it is created. For example, the placeholder can include one or more folders (or directories) and/or one or more files, and the names, sizes, date and times, and any other suitable parameters associated with these folders and/or files can be set to match that of the stored content. At the time of creation, however, these files can be empty rather than actually containing the stored content. That is, the files can appear to have the stored content, but in fact may not. The mechanisms can then begin to issue requests to download portions of the stored content from one or more peer computing devices (e.g., in a P2P network) (which one or more peer computing devices can be referred to as a peer-to-peer (P2P) swarm) to fill the placeholder, receive read and write requests from the application, device, etc. for access to the stored content, and serve those requests as the stored content portions become available. The mechanisms can determine the order in which portions of the stored content are likely to be needed so that those portions can be downloaded in an order that improves and/or minimizes delay that may be experienced by the application, device, etc. and/or a user of the application, device, etc. For example, a portion of the stored content can be classified as high priority and that portion can be retrieved from other peer computing devices prior to other portions. These mechanisms can determine the order in which the portions (e.g., blocks) of the stored content are likely to be needed based on one or more profiles for the stored content. The profile(s) can indicate one or more characteristics of the stored content, such as expected block access order, block access history, which blocks are needed in particular usage scenarios or events, expected timing, relative importance, and/or any other suitable characteristics.

In another more particular example of such embodiments, these mechanisms can also initially provide a file system that is empty. In response to a request for a portion of a virtual machine image for a virtual machine or a virtual appliance (collectively, hereinafter, "the virtual machine" or "the VM") from a hypervisor or virtual machine manager (the VMM), the mechanisms can create a suitable placeholder in the file system for the virtual machine image (the VM image) associated with the virtual machine. The placeholder can include any suitable file system content at the time that it is created. For example, the placeholder can include one or more folders (or directories) and/or one or more files, and the names, sizes, date and times, and any other suitable parameters associated with these folders and/or files can be set to match that of the VM image. At the time of creation, however, these files can be empty rather than actually containing the VM image. That is, the files can appear to have the VM image, but in fact may not. The mechanisms can then begin to issue requests to download portions of the VM image from one or more peer computing devices (e.g., in a P2P network) (which one or more peer computing devices can be referred to as a peer-to-peer (P2P) swarm) to fill the placeholder, receive read and write requests from the VMM or the VM for access to the VM image, and serve those requests as the VM image portions become available. The mechanisms can determine the order in which portions of the VM image are likely to be needed so that those portions can be downloaded in an order that improves and/or minimizes delay that may be experienced by the VMM or the VM and/or a user of the VMM or the VM. For example, a portion of the VM image can be classified as high priority and that portion can be retrieved from other peer computing devices prior to other portions. These mechanisms can determine the order in which the portions (e.g., blocks) of the image are likely to be needed based on one or more profiles for the VM image. The profile(s) can indicate one or more characteristics of the VM image, such as expected block access order, block access history, which blocks are needed in particular usage scenarios or events, expected timing, relative importance, and/or any other suitable characteristics.

In accordance with some embodiments, different types of requests for requesting portions of stored content can be used and any suitable number of different types of requests can be used. For example, in some embodiments, three types of requests can be used: demand requests; profile requests; and default requests. A demand request is a request that can be issued in response to a demand for a portion of stored content (e.g., a file, a program, stored data, etc.). Demand requests can have high priority because the requested content may be needed immediately. A profile request is a request for a portion of stored content that is based on a profile of how the stored content is likely to be accessed. Profile requests can have a high priority when stored content identified in the requests are likely to be needed soon. A default request is a request that can be issued when there is capacity to issue a request, but no demand request or profile request is being generated. Default requests can have low priority and no latency requirements in some embodiments.

Figure 1:
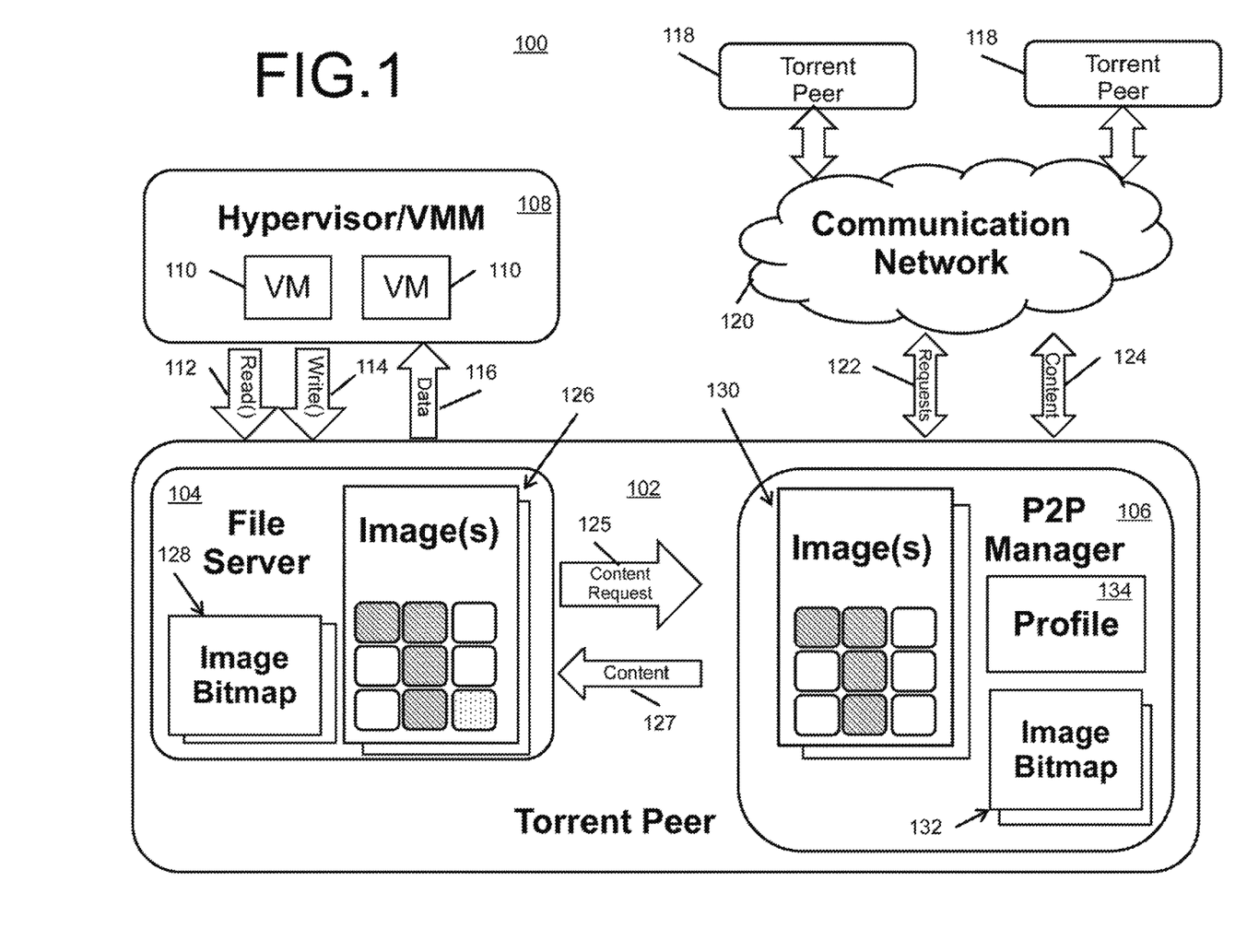
FIG. 1 is a block diagram of an example of an architecture including a torrent peer in accordance with some embodiments.

Turning to FIG. 1, an example of an architecture 100 for providing a torrent peer that can be used as a mechanism for stored content distribution and access is shown. As illustrated, the torrent peer can be provided for use in connection with a virtual machine in accordance with some embodiments. Although the example of FIG. 1 shows a torrent peer for use with a virtual machine, torrent peers as described herein can be used in any suitable application in accordance with some embodiments.

As shown in FIG. 1, a torrent peer 102 can include a file server (FS) 104 and a peer-to-peer manager (P2PM) 106. File server 104 can provide an application, device, etc. (such as a VMM or VM) with read and write access to stored content (e.g., such as a VM's disk image) in some embodiments. The FS can operate similarly to a traditional remote file system. For example, a root directory of the FS can be mounted in a designated location, making its files visible to the application, device, etc., and all disk accesses performed to the sub-tree under this mount point can be intercepted by the operating system and delegated to the FS. In this way, in some embodiments, the FS can enable a standard file system view that is indistinguishable from that of other common remote file systems such as NFS and CIFS.

As shown in FIG. 1, in some embodiments, torrent peer 102 can be coupled to a hypervisor/virtual machine manager (VMM) 108 that executes one or more virtual machines (VMs) 110. In some embodiments, the standard file system view provided by the file server can allow the torrent peer to operate in a manner that is fully transparent to the VMM and/or VM(s).

FS 104 and P2PM 106 can include one or more stored content images 126 corresponding to VMs 110 in the VMM 108. For example, the stored content images 126 can be VM images in some embodiments. During operation, VMM 108 and/or VMs 110 can send write and read requests 112 and 114 to access images 126 of the FS and the FS can return stored content from images 116 (in response to read requests 114) to the VMM and/or VMs. FS 104 can determine whether it has the requested content by checking bits in an FS bitmap 128.

If the FS does not have the requested content, it can send a request 125 to the P2PM for the content. This request can be made in any suitable manner and have any suitable format. In response, the FS can receive the requested content 127 from the P2PM.

The torrent peer can also be coupled to one or more other torrent peers 118 via communications network 120. During operation, P2PM 106 of torrent peer 102 can send and receive requests 122 for portions of stored content needed by or contained in P2PM 106, respectively. The P2PM can determine that it needs content in response to a demand request from the FS, based on the contents of profile 134, or based on any other suitable criteria or criterion. In response to requests for stored content needed by the P2PM, the P2PM can receive content 124 from the P2PM, store the content in an image 130, set bits in an P2PM bitmap 132 corresponding to the received content, and send the content to the FS as content 127. The P2PM can determine whether it can respond to requests from other peers 118 for content by checking P2PM bitmap(s) 132. For example, if a bit in P2PM bitmap 132 is set, that corresponding content may then be available in images 130 to provide to peers 118.

Figure 2:
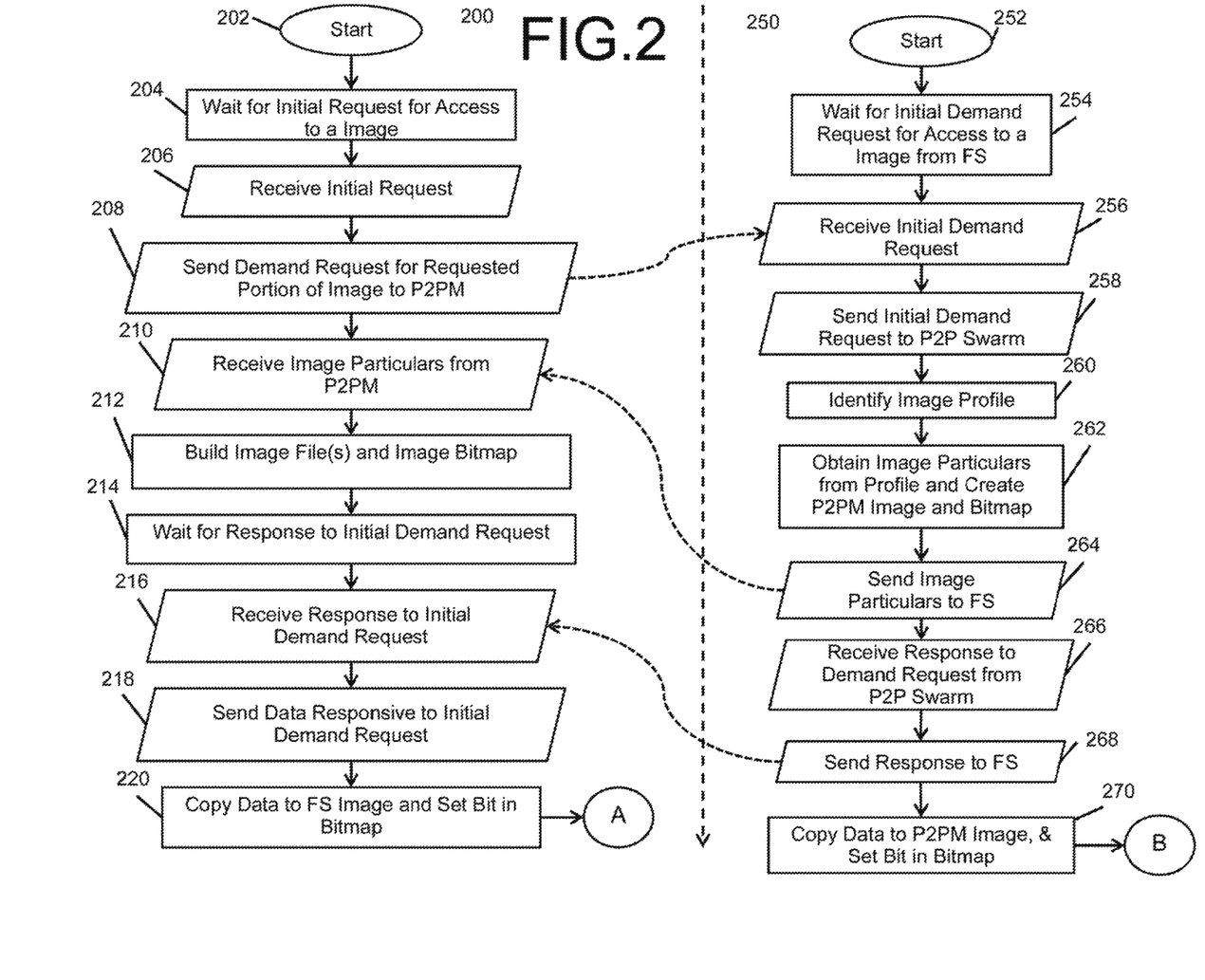
FIG. 2 includes two diagrams showing examples of portions of processes for implementing a file server (FS) and a peer-to-peer manager (P2PM) in accordance with some embodiments.

FIG. 2 shows examples processes 200 and 250 that can be executed in FS 104 and P2PM 106, respectively, in accordance with some embodiments to facilitate starting execution of an application (e.g., such as VM 110 in VMM 108). As illustrated, after process 200 begins at 202, the process can first wait for an initial request to read an image at 204 (e.g., from VMM 108). This request can then be received at 206. Next, when no image corresponding to this request is contained in FS 104, process 200 can send a demand request for the requested portion of the image to P2PM 106.

Meanwhile, after beginning at 252, process 250 can be waiting for the initial demand request from the FS at 254. This initial demand request can then be received at 256. When data corresponding to this initial request is not contained in the image(s) of the P2PM, process 250 can send the demand request to other torrent peers 118 (which can also be referred to as a "P2P swarm") via communication network 120 at 258. Next, process 250 can identify an image profile corresponding to the initial request at 260, and obtain particulars of the image from the profile and create the P2PM image and a P2PM bitmap at 262. Any suitable particulars can be obtained. For example, the name of each file and its size in the image can be obtained. These particulars can then be sent to the FS via process 200 at 264.

As shown at 210 of process 200, these particulars can then be received by the FS. Process 200 can then build an image place holder and an FS bitmap in the FS at 212. The image placeholder can be used as a holding place in the FS for portions of the image that are subsequently received. The placeholder can include any suitable file system content at the time that it is created. For example, the placeholder can include one or more folders (or directories) and/or one or more files, and the names, sizes, date and times, and any other suitable parameters associated with these folders and/or files can be set to match that of the stored content. At the time of creation, however, these files can be empty rather than actually containing the stored content. That is, the files can appear to have the stored content, but in fact may not be until the content gradually streams-in from the P2P network.

The FS bitmap built at 212 can be used to identify which portions of the image are contained in the FS. Each bit in the bitmap can correspond to a "block" of storage space, which block can be any suitably sized portion of the image. Initially, this bitmap can be empty to correspond to the empty placeholder. Although a bitmap is described as being used to track what portions of an image are contained in the FS, any suitable data structure or other mechanism can be used to perform this function in some embodiments. Next, process 200 can wait for the response to the initial demand request at 214.

Returning to process 250, after the response to the initial demand request is received from the P2P Swarm at 266, the process can then send the response to the FS at 268, and copy the corresponding data to the P2PM's image and set the corresponding bits in the P2PM bitmap at 270.

As shown at 216 of process 200, this response can be received by the FS at 216, after which the data responsive to this initial request can be sent to the application (e.g., the VMM) at 218 and this data copied to the FS image and the corresponding bit in the FS bitmap set at 220.

Figure 3:
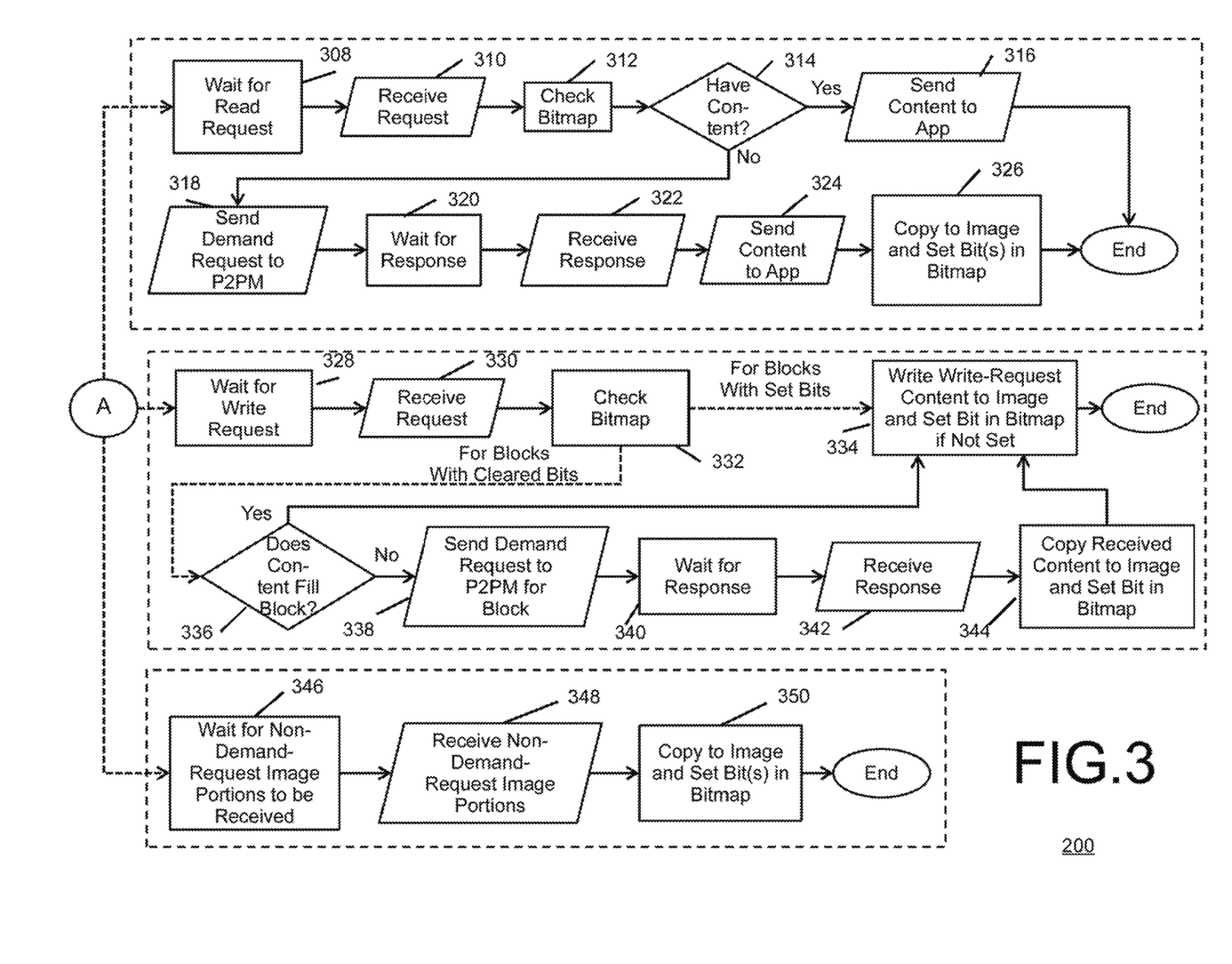
FIG. 3 is a diagram showing a continuation of example process 200 of FIG. 3 in accordance with some embodiments.
Figure 4:
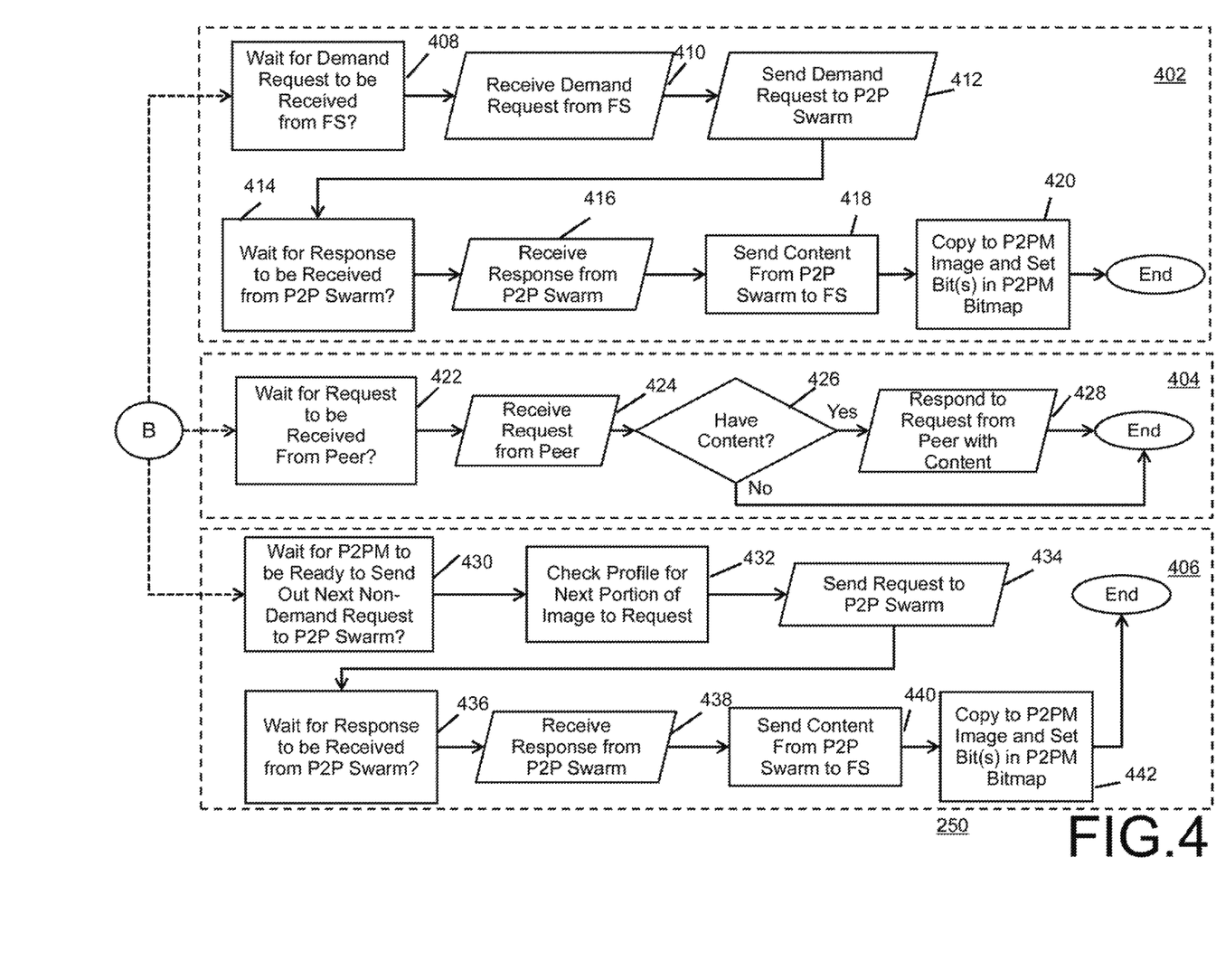
FIG. 4 is a diagram showing a continuation of example process 250 of FIG. 3 in accordance with some embodiments.

Process 200 and 250 can then continue as shown at A and B in FIGS. 3 and 4, respectively.

As shown in FIG. 3, process 200 can subsequently perform threads in response to received read requests in section 302, in response to received write requests in section 304, and in response to received non-demand-request image portions in section 306. In some embodiments, for each received read request, write request, and non-demand-request image portion, a thread can be instantiated as shown in sections 302, 304, and 306, respectively. That is, in some embodiments, zero or more threads for each of sections 302, 304, and 306 can be spawned based on the received read request(s), write request(s), and non-demand-request image portion(s).

As illustrated, in section 302, FS process 200 can first wait for a read request at 308 and receive the read request at 310 from an application, device, etc. (e.g., a VMM or a VM). Such a request can include a tuple of the form <<file,offset, length>>, indicating that the request is attempting file access to a contiguous range of stored content of a particular length starting at a given offset.

Process 200 can next check the FS bitmap in the FS at 312 to determine if the requested content is present in the FS. If the content is determined to be present, then at 314, process 200 can branch to 316 at which it can send the requested content to the requesting application, device, etc. (e.g., a VMM or a VM). Otherwise, if the content is determined to not be present at 314, process 200 can send a demand request to the P2PM at 318.

Next, process 200 can wait for a response to the demand request at 320, and then receive the response at 322. The requested content can then be sent to the requesting application, device, etc. (e.g., a VMM or a VM) at 324. Finally, at 326, the content can be copied to an image in the FS and the corresponding bit(s) in the FS bitmap set.

As illustrated, in section 304, FS process 200 can first wait for a write request at 328 and receive the write request at 330 from an application, device, etc. (e.g., a VMM or a VM). Such a request can include a tuple of the form <<file,offset, length>>, indicating that the request is attempting file access to a contiguous range of stored content of a particular length starting at a given offset.

At 332, process 200 can next check the FS bitmap in the FS at 328 to determine if the target blocks of the image to which the write request will write content already have content in them. As described above, each bit in the bitmap can correspond to a block of stored content. When content is received from the P2PM at the FS, this content can be received in integer numbers of blocks.

For each target block with a set bit in the FS bitmap, process 200 can then write the write-request content to the corresponding block of the image at 334.

For each target block with a cleared bit in the FS bitmap, process 200 can next determine if the write-request content will fill the corresponding block of the image at 336. If so, then process 200 can write the write-request content to the corresponding block of the image and set the corresponding bit in the FS bitmap at 334. Otherwise, process 200 can send a demand request for the content of the block of the image to the P2PM at 338. Next, process 200 can wait for a response to the demand request at 340, and then receive the response at 342. The received response content can then be copied to an image in the FS and the corresponding bit in the FS bitmap set at 344. Finally, at 334, process 200 can write the write-request data to the corresponding block of the image.

As illustrated, in section 306, FS process 200 can first wait for non-demand-request image portions to be received at 346. Next, at 348, the non-demand-request image portions can be received. Finally, the image portions can be copied to the FS image and the corresponding bit(s) in the FS bitmap set at 350.

As shown in FIG. 4, process 250 can subsequently perform threads in response to received demand requests in section 402, in response to received requests from peers in section 404, and in response to the P2PM being ready to send out the next non-demand request to the P2P swarm in section 404. In some embodiments, for each received demand request, for each received request from a peer, and for each instance at which the P2PM is ready to send out the next non-demand-request to the P2P swarm, a thread can be instantiated as shown in sections 402, 404, and 406, respectively. That is, in some embodiments, zero or more threads for each of sections 402, 404, and 406 can be spawned based on the received demand request(s), received request(s) from a peer, and the instance(s) at which the P2PM is ready to send out the next non-demand-request to the P2P swarm.

As illustrated, in section 402, P2PM process 250 can first wait for a demand request to be received from the FS at 408. Next, at 410, the demand request from the FS can be received. The P2PM can then send a demand request for the corresponding content to the P2P swarm at 412. Process 250 can wait for a response from the P2P swarm to be received at 414 and then receive the response at 416. The response can be sent to the FS at 418 and the content corresponding to the response can be copied to the P2PM image and the corresponding bit(s) set in the P2PM bitmap at 420.

As illustrated, in section 404, P2PM process 250 can first wait for a request to be received from a peer at 422. Next, at 424, the request from the peer can be received. Process 250 can then determine at 426 whether it has content responsive to the peer's request, and, if so, it can send a response with the content to the peer at 428. Otherwise, the thread of section 404 can terminate.

As illustrated, in section 406, P2PM process 250 can first wait for the P2PM to be ready to send out the next non-demand request to the P2P swarm at 430. When the next non-demand request is to be sent, then process 250 can check the profile for the next portion of the image to request at 432. Then, process 250 can send the request to the P2P swarm at 434. Process 250 can wait for a response from the P2P swarm to be received at 436 and then receive the response at 438. The response can be sent to the FS at 440 and the content corresponding to the response can be copied to the P2PM image and the corresponding bit(s) set in the P2PM bitmap at 442.

In some embodiments, in order to save space, the FS can be configured to only store portions of the image that have been modified and retrieve other portions of the image from the P2PM when needed for read requests. Which portions have been modified can be tracked using the FS bitmap in such a scenario.

Any suitable technique can be used for determining at 430 whether process 250 is ready to send out the next non-demand request to the P2P swarm in some embodiments. For example, the issuance of non-demand requests may be rate limited in some embodiments in order to prevent the P2PM from using more system resources than necessary. As a more particular example, the issuance of default priority requests can be limited so as to not impact other processes also running on a host device. As another more particular example, the P2PM can rate limit non-demand requests so as to allow other the P2PM of other torrent peers to have a higher priority in accessing image content from the P2P swarm.

Any suitable technique can be used for determining what portion of the image to request next in a non-demand request at 432. For example, in some embodiments, the portion to request next can be based on an ordering of portions in a profile for the image. In some embodiments, the portions in such an image can have indicators associated with them to indicate the likelihood that each portion will be needed at the corresponding order location.

For example, in some embodiments, portions of a VM image can be requested in the order they are listed in a profile. A frequency of appearance indicator can be associated with each portion of content in the profile. This indicator can indicate the percentage of times that the corresponding portion was requested for the image at the designated order location. In some embodiments, portions with frequency of appearance indicators below a certain value can be ignored. For example, portions with frequency of appearance indicators below 0.25 can be ignored in some embodiments and only requested using default requests or demand requests.

To help minimize the number of instances in which the same image portion is being requested by multiple torrent peers at the same time, a window-randomized piece selection policy can be used in some embodiments. Under such a policy, at a given point in time, one of the first k pieces at the head of each peer P2PM's prediction queue can be randomly picked for the next image portion to be requested.

In some embodiments, the window size, k, is a tunable parameter that attempts to balance the urgency of obtaining the content against the need for sufficient diversity in the portions of the content that are being requested by the peers. If a large k is chosen, the gain from accurately predicting the best content portion to access next may degrade as portions of content fail to be received in the order of predicted use due to congestion in many peers requesting the same portion simultaneously. On the other hand, the choice of an overly small k may prevent the swarm from providing scalability since too little content portion diversity may be achieved. Consequently, as the number of peers decreases, the time staggering of peers increases, or the usage pattern diversity increases, the optimal k may be tend to be lower and vice-versa.

In accordance with some embodiments, the controlling the size of portion of content that are requested can be used to improve performance of the P2P swarm in providing image content. Portion size can be an important parameter for the overall performance, as it can determine the degree of both the parallelism and overhead peers will encounter. In particular, for example, small portions can be suitable for small-sized content, but may severely affect system performance for larger content. Smaller pieces can produce proportionately larger meta-info files and can incur considerably higher communication overhead.

In accordance with some embodiments, by using smaller portion sizes, the number of instances in which a write request would not overwrite a complete block of an image can be reduced.

In accordance with some embodiments, blocks can be sized to be 16 kilobytes and multiple blocks can be included in one piece of content to be requested by the FS from the P2PM and by the P2PM from the P2P swarm. In accordance with some embodiments, contiguous ranges of blocks can be packed into pieces using a straightforward modulo operator on a block index. In some embodiments, data compression can be used at the block-level. In some embodiments, default pieces can be downloaded rarest-first.

In accordance with some embodiments, the processing of threads in sections 402, 404, and 406 can be prioritized in some instances. For example, in some embodiments, demand requests received from the FS can be given the highest priority and those threads can be processed first. As another example, in some embodiments, demand requests from peers can be given a high priority. However, in accordance with some embodiments, demand requests do not always have to have priority over non-demand requests. For example, in accordance with some embodiments, instead of giving demand requests from peers deterministic priority over profile requests for a P2PM's corresponding FS, recently filled peer-originated demand requests can be tracked and subsequent peer-originated demand requests for the same piece can be given a lower priority that profile requests from a P2PM's corresponding FS. As another example, in some embodiments, peers may keep local estimates of current swarming efficiency (based on upload and download rates to peers) and use these to reprioritize demand requests and profile requests. More particularly, for example, when swarming efficiency is low, a peer may increase the priority of profile requests and vice-versa.

Any suitable profiles can be used in some embodiments and such profiles can be constructed in any suitable manner. For example, in some embodiments, to build profiles, image access patterns can be analyzed for a variety of applications, devices, etc. (e.g., VMs) and workloads. For each application, device, etc./workload combination, the access order, access time, frequency of use, and/or any other suitable characteristic(s) can be examined. Those sections of the image that are common across the runs can be identified, and identifiers for the sections can be encoded in a profile that can be utilized by the P2PM's prediction logic.

For example, in accordance with some embodiments, a set of workload scenarios designed to simulate typical short VDI user tasks can be used to construct a profile. These scenarios can represent different user activities on desktop virtual appliances. These scenarios can include first booting a guest VM, then executing a script that performs a desired task by mimicking user actions, and finally shutting-down the guest VM. To automate the execution of these scenarios, guest VMs can be configured to auto-login once they boot, and then execute a script that selects the appropriate task to run.

Any suitable number of runs against each scenario can be used in some embodiments. For example, in some embodiments, a single run can be used for each application, device, etc./task combination. As another example, in some embodiments, 1000 runs can be used for each application, device, etc./task combination.

In some embodiments, when performing multiple runs for the same scenario, the specific tasks or order of tasks that are performed in the scenario can be changed, to simulate different user actions that might be performed in completing a task.

The access to each portion of a image can then be noted. Any suitable characteristics of these accesses can be noted. For example, the access times and number of times each portion is accessed can be noted.

The average access time across multiple runs for each portion of the image can be determined and then indicators for each portion in the image located in the profile at the corresponding average access time order. When two or more portions of the image occur at the same time, the ordering of the corresponding indicators in the profile can be determined randomly or based on any other suitable criteria or criterion (such as the median access time, the earliest access time, etc.). In some embodiments, when using runs from different machine types to create a profile, these runs can first be normalized to remove timing differences caused by different machine speeds.

In some embodiments, sequences of image accesses that are subject to rigid timeout checks can be identified and marked accordingly in the profile. The file server can then block access attempts before such sequences of images (or one or more portions thereof) and then issue demand requests for all image portions in the sequences (or one or more portions thereof). For example, in some embodiments, when the file server requests a portion of the image that indicates the beginning of such a sequence from the P2PM, the P2PM, based on a profile, can automatically generate demand requests for other portions in the sequence. As another example, in some embodiments, when the file server requests a portion of the image that indicates the beginning of such a sequence from the P2PM, the P2PM, based on a profile, can indicate to the FS that it should issue demand requests for all of the portions of the sequence.

In some embodiments, a profile can identify clusters. For example, a cluster can be a set of blocks that are correlated within one another (i.e., one is likely to be accessed if others in the cluster are accessed). Based on such clustering, in some embodiments, all blocks (or pieces consisting of blocks) in a cluster can be requested as soon as any portion of the cluster has been requested. For example, in some embodiments, when the file server requests a portion of a cluster, the P2PM, based on a profile, can automatically generate demand requests for other portions of the cluster. As another example, in some embodiments, when the file server requests a portion of a cluster, the P2PM, based on a profile, can indicate to the FS that it should issue demand requests for all of the portions of the cluster.

Any suitable hardware and/or software can be used to implement a torrent peer in some embodiments. For example, in accordance with some embodiments, one or more of the torrent peers described herein can be implemented at least in part in one or more computer systems. These computer systems can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. The file server can be based on bindfs (available from http://code.google.com/p/bindfs/wiki/Installation) and FUSE (available from http://fuse.sourceforge.net) in some embodiments. The P2PM can be based on the libtorrent 0.15.5 library (available from http://libtorrent.rakshasa.no/) in some embodiments.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited on by the claims which follow. Features of the disclosed embodiments can be combined and rearranged in various ways.

What is claimed is:

1. A method for distributing and providing access to executable instructions, comprising:
    creating, by a hardware processor, a placeholder in local storage for the executable instructions so that the placeholder has at least one parameter identical to the executable instructions and the placeholder can hold a first portion of the executable instructions and at least a second portion of the executable instructions;
    storing, by the hardware processor, the first portion of the executable instructions in the placeholder;
    before the second portion of the executable instructions has been stored in the placeholder, providing, by the hardware processor, the first portion of the executable instructions to a requestor;

determining, by the hardware processor, a profile associated with the executable instructions, wherein indicators in the profile indicate an order in which a plurality of portions of the executable instructions are likely to be accessed;

based on the indicators in the profile, selecting, by the hardware processor, the second portion of the executable instructions to be retrieved before it is requested by the requestor;

receiving, by the hardware processor, a second request for the second portion of the executable instructions from the requestor after receiving the second portion of the executable instructions;

providing, by the hardware processor, the second portion of the executable instructions to the requestor;

receiving, by the hardware processor, a third request to write data to a first data portion of the local storage;

determining, by the hardware processor, if the first data portion has content;

in response to a first condition in which the first data portion is determined to not have content, requesting the content, receiving the content, writing the content to the first data portion, and writing the data to the first data portion after the content has been written to the first data portion, by the hardware processor; and in response to a second condition in which the first data portion is determined to have the content, writing the data to the first data portion by the hardware processor.

2. The method of claim 1, wherein the profile indicates an order location for each of a plurality of the portions of the executable instructions.

3. The method of claim 1, wherein the profile indicates a probability that each of a plurality of the portions of the executable instructions will be accessed at a corresponding order location.

4. The method of claim 1, wherein the requestor is at least one of a virtual machine and a virtual machine monitor.

5. The method of claim 1, further comprising maintaining read-only copies of portions of the executable instructions.

6. The method of claim 5, further comprising receiving requests for the read-only copies of the portions of the executable instructions and providing the read-only copies to a remote, peer device.

7. The method of claim 1, wherein the remote storage is in a peer device.

8. The method of claim 1, further comprising:
determining, by the hardware processor, whether the data is large enough to fill the first data portion; and
in response to a third condition in which the first data portion is determined to not have the content and in which the data is determined to be large enough to fill the first data portion, writing the data to the first data portion by the hardware processor,
wherein, in the first condition, the data is determined to not be large enough to fill the first data portion.

9. A system for distributing and providing access to executable instructions, comprising:
a memory; and
at least one hardware processor that:
creates a placeholder in local storage for the executable instructions so that the placeholder has at least one parameter identical to the executable instructions and the placeholder can hold a first portion of the executable instructions and at least a second portion of the executable instructions;
stores the first portion of the executable instructions in the placeholder;
before the second portion of the executable instructions has been stored in the placeholder, provides the first portion of the executable instructions to a requestor;
determines a profile associated with the executable instructions, wherein indicators in the profile indicate an order in which a plurality of portions of the executable instructions are likely to be accessed;
based on the indicators in the profile, selects the second portion of the executable instructions to be retrieved before it is requested by the requestor;
receives a second request for the second portion of the executable instructions from the requestor after receiving the second portion of the executable instructions;
provides the second portion of the executable instructions to the requestor;
receives a third request to write data to a first data portion of the local storage;
determines if the first data portion has content;
in response to a first condition in which the first data portion is determined to not have content, requests the content, receives the content, writes the content to the first data portion, and writes the data to the first data portion after the content has been written to the first data portion; and
in response to a second condition in which the first data portion is determined to have the content, writes the data to the first data portion.

10. The system of claim 9, wherein the profile indicates an order location for each of a plurality of the portions of the executable instructions.

11. The system of claim 9, wherein the profile indicates a probability that each of a plurality of the portions of the executable instructions will be accessed at a corresponding order location.

12. The system of claim 9, wherein the requestor is at least one of a virtual machine and a virtual machine monitor.

13. The system of claim 9, wherein the at least one hardware processor also maintains read-only copies of portions of the executable instructions.

14. The system of claim 13, wherein the at least one hardware processor also receives requests for the read-only copies of the portions of the executable instructions and provides the read-only copies to a remote, peer device.

15. The system of claim 9, wherein the remote storage is in a peer device.

16. The system of claim 9, wherein the at least one hardware processor also:
determines whether the data is large enough to fill the first data portion; and
in response to a third condition in which the first data portion is determined to not have the content and in which the data is determined to be large enough to fill the first data portion, writes the data to the first data portion,
wherein, in the first condition, the data is determined to not be large enough to fill the first data portion.

17. A non-transitory computer-readable medium containing computer-executable instructions that, when executed by a processor, cause the processor to perform a method for distributing and providing access to executable instructions, the method comprising:
creating a placeholder in local storage for the executable instructions so that the placeholder has at least one parameter identical to the executable instructions and the placeholder can hold a first portion of the executable instructions and at least a second portion of the executable instructions;

storing the first portion of the executable instructions in the placeholder;

before the second portion of the executable instructions has been stored in the placeholder, providing the first portion of the executable instructions to a requestor;

determining a profile associated with the executable instructions, wherein indicators in the profile indicate an order in which a plurality of portions of the executable instructions are likely to be accessed;

based on the indicators in the profile, selecting the second portion of the executable instructions to be retrieved before it is requested by the requestor;

receiving a second request for the second portion of the executable instructions from the requestor after receiving the second portion of the executable instructions;

providing the second portion of the executable instructions to the requestor;

receiving a third request to write data to a first data portion of the local storage;

determining if the first data portion has content;

in response to a first condition in which the first data portion is determined to not have content, requesting the content, receiving the content, writing the content to the first data portion, and writing the data to the first data portion after the content has been written to the first data portion; and in response to a second condition in which the first data portion is determined to have the content, writing the data to the first data portion.

18. The medium of claim 17, wherein the profile indicates an order location for each of a plurality of the portions of the executable instructions.

19. The medium of claim 17, wherein the profile indicates a probability that each of a plurality of the portions of the executable instructions will be accessed at a corresponding order location.

20. The medium of claim 17, wherein the requestor is at least one of a virtual machine and a virtual machine monitor.

21. The medium of claim 17, wherein the method further comprises maintaining read-only copies of portions of the executable instructions.

22. The medium of claim 21, wherein the method further comprises receiving requests for the read-only copies of the portions of the executable instructions and providing the read-only copies to a remote, peer device.

23. The medium of claim 17, wherein the remote storage is in a peer device.

24. The medium of claim 17, wherein the method further comprises:
   determining whether the data is large enough to fill the first data portion; and
   in response to a third condition in which the first data portion is determined to not have the content and in which the data is determined to be large enough to fill the first data portion, writing the data to the first data portion,
   wherein, in the first condition, the data is determined to not be large enough to fill the first data portion.

* * * * *